United States Patent
Cordoves

(10) Patent No.: US 7,131,790 B1
(45) Date of Patent: Nov. 7, 2006

(54) BORING AND CONDUIT/PIPE SYSTEM

(76) Inventor: Jorge L. Cordoves, 35 Prospect St., Elizabeth, NJ (US) 07201

( * ) Notice: Subject to any disclaimer, the term of this patent is extended or adjusted under 35 U.S.C. 154(b) by 263 days.

(21) Appl. No.: 10/807,618

(22) Filed: Mar. 24, 2004

(51) Int. Cl.
   *F16L 1/00* (2006.01)
   *B23B 27/10* (2006.01)

(52) U.S. Cl. .................. 405/184; 175/53; 175/339; 408/59

(58) Field of Classification Search ........... 405/184, 405/184.1, 184.4; 173/138, 98, 99; 408/226, 408/59, 230; 175/53, 393, 339
   See application file for complete search history.

(56) References Cited

U.S. PATENT DOCUMENTS

| | | | | |
|---|---|---|---|---|
| 3,697,188 A | * | 10/1972 | Pope | 408/230 |
| 3,871,488 A | * | 3/1975 | Sabre | 175/406 |
| 4,785,885 A | * | 11/1988 | Cherrington et al. | 166/285 |
| 5,542,486 A | * | 8/1996 | Curlett | 175/424 |
| 6,682,264 B1 | * | 1/2004 | McGillis | 405/184 |
| 2001/0016148 A1 | * | 8/2001 | Wentworth et al. | 405/184 |

\* cited by examiner

*Primary Examiner*—David Bagnell
*Assistant Examiner*—Robert Fuller
(74) *Attorney, Agent, or Firm*—Edward P. Dutkiewicz

(57) ABSTRACT

An extension rod has an interior end and an exterior end. The exterior end is formed with male screw threads. A primary bit has a cylindrical interior end and a conical exterior. Female threads at the interior end releasably couple with the extension rod. A secondary bit has a cylindrical interior end and a conical exterior end. Female threads at the interior end releasably couple with the extension rod. A length of line is coupled to the exterior end of the secondary bit. A coupler has a rearward end couplable to a linear member. A forward end is couplable to the rearward end of the secondary bit. In this manner the line, secondary bit and linear member may be pulled through the bore hole.

3 Claims, 5 Drawing Sheets

FIG 3
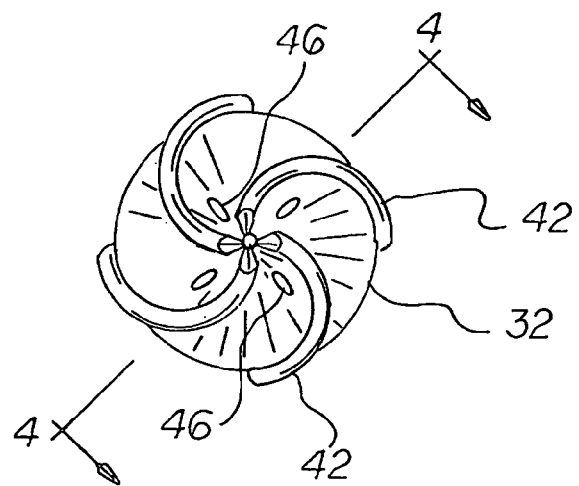
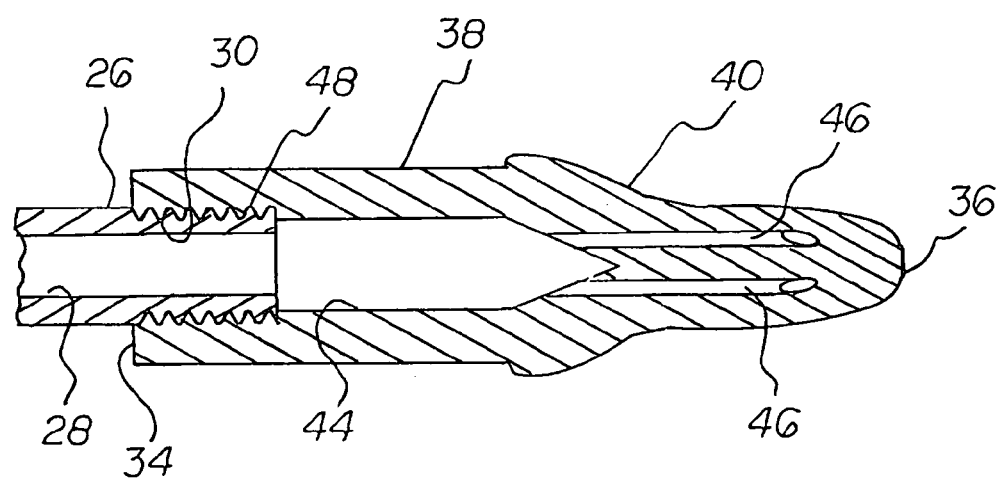
FIG 4

FIG 7
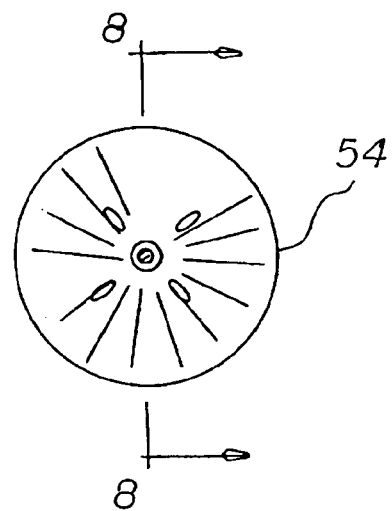
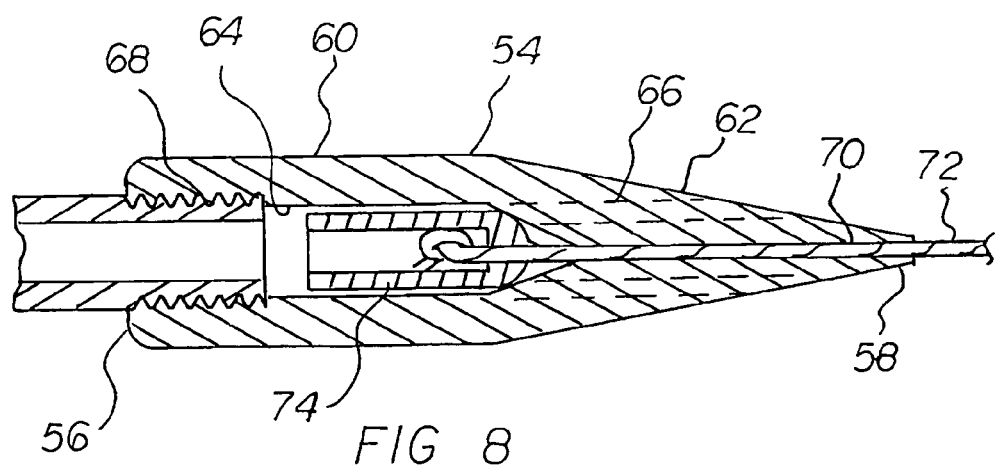
FIG 8

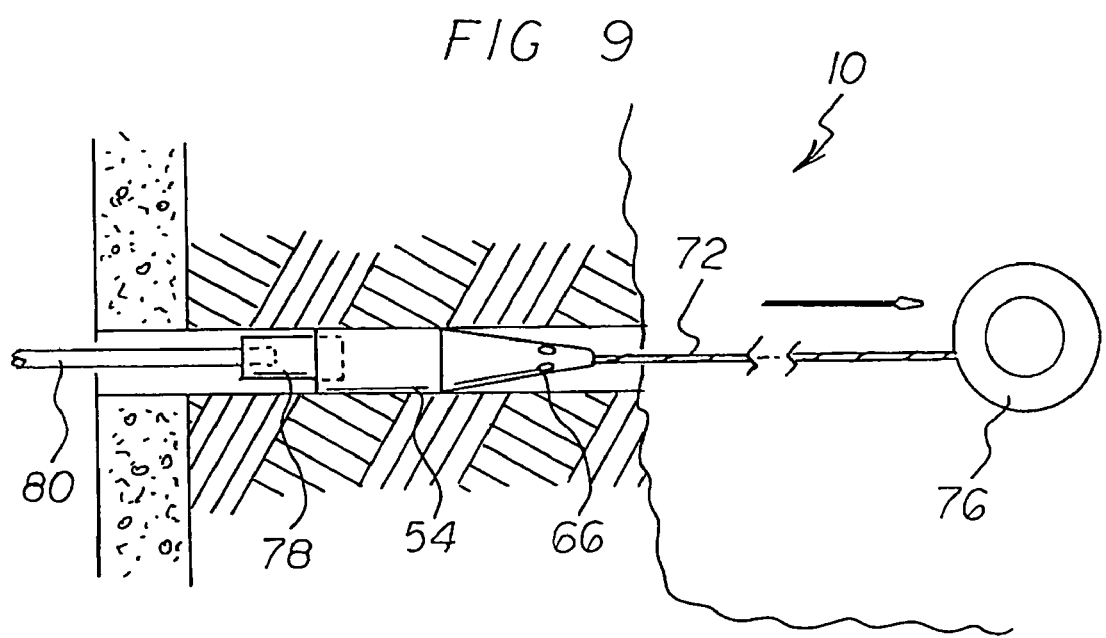

BORING AND CONDUIT/PIPE SYSTEM

BACKGROUND OF THE INVENTION

1. Field of the Invention

The present invention relates to a boring and conduit/pipe system and more particularly pertains to forming a hole through a wall and for pulling a linear member through a hole.

2. Description of the Prior Art

The use of boring and conduit/pipe systems of known designs and configurations is known in the prior art. More specifically, boring and conduit/pipe systems of known designs and configurations previously devised and utilized for the purpose of boring through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,888,035 issued Mar. 30, 1999 to Cutler relates to a system for installing a length of cable within a wall. U.S. Pat. No. 6,561,269 issued May 13, 2003 to Brown relates to a canister, sealing method and composition for sealing a bore hole. U.S. Pat. No. 5,242,026 issued Sep. 7, 1993 to Deken relates to a method and apparatus for drilling a horizontal controlled borehole in the earth. U.S. Pat. No. 5,133,418 issued Jul. 28, 1992 to Gibson relates to a directional drilling system with eccentric mounted motor and biaxial sensor and method. U.S. Pat. No. 4,953,638 issued Sep. 4, 1990 to Dunn relates to a method and apparatus for drilling a horizontal controlled borehole in the earth. U.S. Pat. No. 4,942,930 issued Jul. 24, 1990 to Millsapps relates to a lubrication system for an earth boring drill bit and method for filling and retrofit installing thereof. U.S. Pat. No. 4,143,723 issued Mar. 13, 1979 to Schmotzer relates to a carbide tipped drill bit for boring holes in concrete and steel. Lastly, U.S. Pat. No. 3,737,245 issued Mar. 30, 1973 to Mater relates to a drill bit for pole boring machine.

While these devices fulfill their respective, particular objectives and requirements, the aforementioned patents do not describe boring and conduit/pipe system that allows forming a hole through a wall and for pulling a linear member through a hole.

In this respect, the boring and conduit/pipe system according to the present invention substantially departs from the conventional concepts and designs of the prior art, and in doing so provides an apparatus primarily developed for the purpose of forming a hole through a wall and for pulling a linear member through a hole.

Therefore, it can be appreciated that there exists a continuing need for a new and improved boring and conduit/pipe system which can be used for forming a hole through a wall and for pulling a linear member through a hole. In this regard, the present invention substantially fulfills this need.

SUMMARY OF THE INVENTION

In view of the foregoing disadvantages inherent in the known types of boring and conduit/pipe systems of known designs and configurations now present in the prior art, the present invention provides an improved boring and conduit/pipe system. As such, the general purpose of the present invention, which will be described subsequently in greater detail, is to provide a new and improved boring and conduit/pipe system and method which has all the advantages of the prior art and none of the disadvantages.

To attain this, the present invention essentially comprises an operator controlled drill. The drill has a chuck. The chuck is rotatable about a central axis. A water passageway is provided through the chuck along the central axis.

An extension rod is provided. The extension rod has an interior end and an exterior end. A water passageway is provided between the interior end and the exterior end along the central axis. The exterior end is formed with male screw threads. The interior end is removably received by the chuck for rotation with the chuck.

Provided next is a primary bit. The primary bit has an interior end and an exterior end. The primary bit has a generally cylindrical section. The generally cylindrical section extends forwardly from the interior end. The primary bit has a conical section. The conical section extends rearwardly from the exterior end. The conical section includes four helical ridges along the length. The primary bit includes a water passageway. The water passageway is formed of a large diameter bore. The large diameter bore extends forwardly from the interior end. The large diameter bore has four small diameter bores. The four small diameter bores extend forwardly from the large diameter bore to an intermediate extent of the conical section. In this manner jets of water are delivered from the chuck, extension rod, large diameter bore and small diameter bores and to exterior of the primary bit between the ridges. The large diameter bore has female threads. The female threads are provided at the interior end. The female threads releasably couple with the male threads of the extension rod for rotation. In this manner a bore hole is formed in a wall. The primary bit is preferably sized to have a length of about 6 inches plus or minus 10 percent. The primary bit is preferable sized to have a maximum diameter of between about 1.5 and 3.0 inches and ridges between about 0.125 and 0.250 inches square in cross section.

Further provided is a secondary bit. The secondary bit has an interior end and an exterior end. The secondary bit has a generally cylindrical section. The cylindrical section extends forwardly from the interior end. The secondary bit has a conical section. The conical section extends rearwardly from the exterior end. The secondary bit includes a water passageway. The water passageway is formed of a large diameter bore. The large diameter bore extends forwardly from the interior end. The large diameter bore has four small diameter bores. The four small diameter bores extend forwardly from the large diameter bore to an intermediate extent of the conical section. In this manner jets of water are delivered from the chuck, extension rod, large diameter bore and small diameter bores and to exterior of the secondary bit. The large diameter bore has female threads. The female threads are provided at the interior end. The female threads releasably couple with the male threads of the extension rod for rotation. A central forward bore is provided. The central forward bore couples the exterior end and the large diameter bore of the secondary bit with a length of line there through. An apertured insert is provided in the large diameter bore. The line has an interior end. The interior end is coupled to the insert. The line has an exterior end. The exterior end is coupled to a winch. In this manner the primary bit may be removed from the extension rod after it has moved through the wall. The secondary bit is attached for retracting the secondary bit and line from the bore hole. The primary bit is preferably sized to correspond with the primary bit.

Provided last is a coupler. The coupler has a rearward end. The rearward end is couplable to a linear member. The linear member is adapted to be pulled through the bore. The coupler has a forward end. The forward end is couplable to the rearward end of the secondary bit after the secondary bit and line have been retracted from the bore hole. In this manner the line, secondary bit and linear member may be pulled through the bore hole. The linear member may be a conduit or pipe or the like.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved boring and conduit/pipe system which has all of the advantages of the prior art boring and conduit/pipe systems of known designs and configurations and none of the disadvantages.

It is another object of the present invention to provide a new and improved boring and conduit/pipe system which may be easily and efficiently manufactured and marketed.

It is further object of the present invention to provide a new and improved boring and conduit/pipe system which is of durable and reliable constructions.

An even further object of the present invention is to provide a new and improved boring and conduit/pipe system which is susceptible of a low cost of manufacture with regard to both materials and labor, and which accordingly is then susceptible of low prices of sale to the consuming public, thereby making such boring and conduit/pipe system economically available to the buying public.

Even still another object of the present invention is to provide a boring and conduit/pipe system for forming a hole through a wall and for pulling a linear member through a hole.

Lastly, it is an object of the present invention to provide a new and improved boring and conduit/pipe system. An extension rod has an interior end and an exterior end. The exterior end is formed with male screw threads. A primary bit has a cylindrical interior end and a conical exterior. Female threads at the interior end releasably couple with the extension rod. A secondary bit has a cylindrical interior end and a conical exterior end. Female threads at the interior end releasably couple with the extension rod. A length of line is coupled to the exterior end of the secondary bit. A coupler has a rearward end couplable to a linear member. A forward end is couplable to the rearward end of the secondary bit. In this manner the line, secondary bit and linear member may be pulled through the bore hole.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged front elevational view of the primary bit taken along line 3—3 of FIG. 2.

FIG. 4 is a cross sectional view of the primary bit taken along line 4—4 of FIG. 3.

FIG. 7 is an enlarged front elevational view of the secondary bit taken along line 7—7 of FIG. 6.

FIG. 8 is a cross sectional view of the secondary bit taken along line 8—8 of FIG. 7.

FIG. 9 is a side elevational view of the boring and conduit/pipe system similar to FIG. 5 but illustrating the secondary bit pulling a cable.

The same reference numerals refer to the same parts throughout the various Figures.

DESCRIPTION OF THE PREFERRED EMBODIMENT

Figure 1:
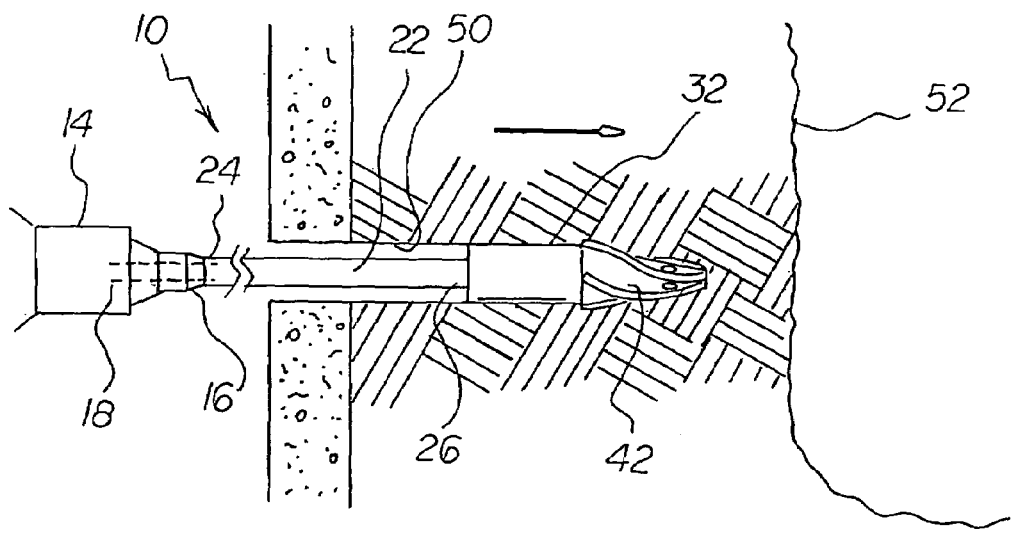
FIG. 1 is a side elevational view of one component of the boring and conduit/pipe system constructed in accordance with the principles of the present invention.
Figure 2:
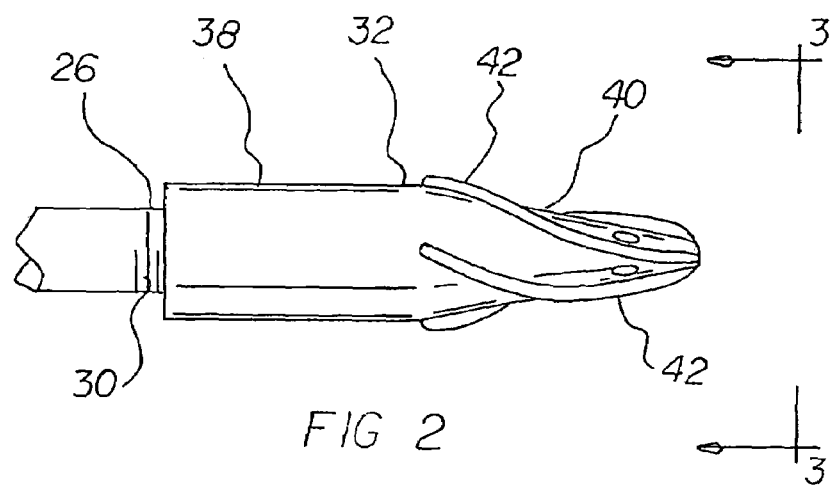
FIG. 2 is an enlarged side elevational view of the primary bit shown in FIG. 1.
Figure 5:
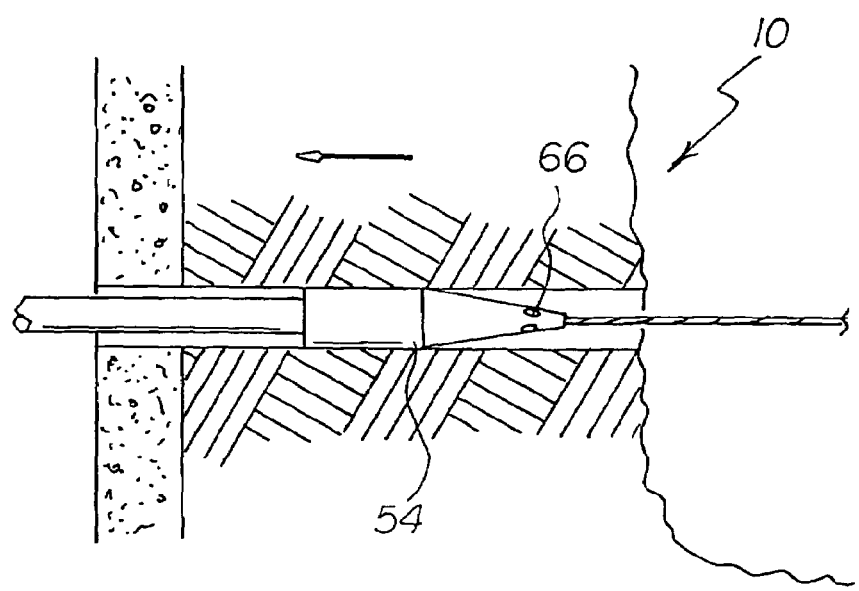
FIG. 5 is a side elevational view of another component of the boring and conduit/pipe system constructed in accordance with the principles of the present invention.
Figure 6:
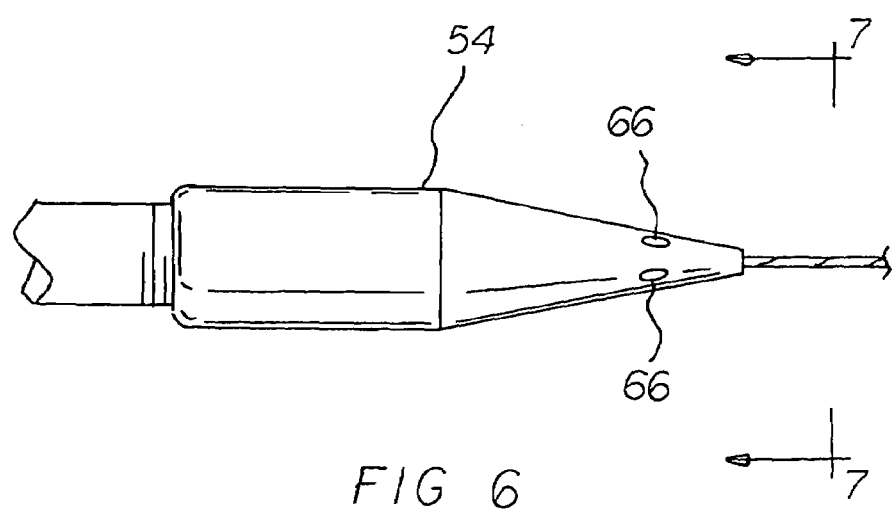
FIG. 6 is an enlarged side elevational view of the secondary bit shown in FIG. 5.

With reference now to the drawings, and in particular to FIG. 1 thereof, the preferred embodiment of the new and improved boring and conduit/pipe system embodying the principles and concepts of the present invention and generally designated by the reference numeral 10 will be described.

The present invention, the boring and conduit/pipe system 10 is comprised of a plurality of components. Such components in their broadest context include an extension rod, a primary bit, a secondary bit, and a coupler. Such components are individually configured and correlated with respect to each other so as to attain the desired objective.

First provided is an operator controlled drill 14. The drill has a chuck 16. The chuck is rotatable about a central axis. A water passageway 18 is provided through the chuck along the central axis.

An extension rod 22 is provided. The extension rod has an interior end 24 and an exterior end 26. A water passageway 28 is provided between the interior end and the exterior end along the central axis. The exterior end is formed with male screw threads 30. The interior end is removably received by the chuck for rotation with the chuck.

Provided next is a primary bit 32. The primary bit has an interior end 34 and an exterior end 36. The primary bit has a generally cylindrical section 38. The generally cylindrical section extends forwardly from the interior end. The primary bit has a conical section 40. The conical section extends rearwardly from the exterior end. The conical section includes four helical ridges 42 along the length. The primary bit includes a water passageway. The water passageway is formed of a large diameter bore 44. The large diameter bore extends forwardly from the interior end. The large diameter bore has four small diameter bores 46. The four small diameter bores extend forwardly from the large diameter bore to an intermediate extent of the conical section. In this manner jets of water are delivered from the chuck, extension rod, large diameter bore and small diameter bores and to exterior of the primary bit between the ridges. The large diameter bore has female threads 48. The female threads are provided at the interior end. The female threads releasably couple with the male threads of the extension rod for rotation. In this manner a bore hole 50 is formed in a wall 52. The primary bit is preferably sized to have a length of about 6 inches plus or minus 10 percent. The primary bit is preferable sized to have a maximum diameter of between about 1.5 and 3.0 inches and ridges between about 0.125 and 0.250 inches square in cross section.

Further provided is a secondary bit 54. The secondary bit has an interior end 56 and an exterior end 58. The secondary bit has a generally cylindrical section 60. The cylindrical section extends forwardly from the interior end. The secondary bit has a conical section 62. The conical section extends rearwardly from the exterior end. The secondary bit includes a water passageway. The water passageway is formed of a large diameter bore 64. The large diameter bore extends forwardly from the interior end. The large diameter bore has four small diameter bores 66. The four small diameter bores extend forwardly from the large diameter bore to an intermediate extent of the conical section. In this manner jets of water are delivered from the chuck, extension rod, large diameter bore and small diameter bores and to exterior of the secondary bit. The large diameter bore has female threads 68. The female threads are provided at the interior end. The female threads releasably couple with the male threads of the extension rod for rotation. A central forward bore 70 is provided. The central forward bore couples the exterior end and the large diameter bore of the secondary bit with a length of line 72 there through. An apertured insert 74 is provided in the large diameter bore. The line has an interior end. The interior end is coupled to the insert. The line has an exterior end. The exterior end is coupled to a winch 76. In this manner the primary bit may be removed from the extension rod after it has moved through the wall. The secondary bit is attached for retracting the secondary bit and line from the bore hole. The secondary bit is preferably sized to correspond with the primary bit.

Provided last is a coupler 78. The coupler has a rearward end. The rearward end is couplable to a linear member 80. The linear member is adapted to be pulled through the bore. The coupler has a forward end. The forward end is couplable to the rearward end of the secondary bit after the secondary bit and line have been retracted from the bore hole. In this manner the line, secondary bit and linear member may be pulled through the bore hole. The linear member may be an electrical conduit or water pipe or the like.

In operation and use, the primary bit would be coupled to the interior end of a drilling pipe functioning an extension rod. The interior end of this extension rod would be coupled to a swiveling "T" fitting that would be equipped with a small hose fitting and valve assembly. The interior rotating portion of this assembly could be connected to the chuck of a heavy-duty electric drill. Working from the basement of a structure, this bit would be used to bore through the concrete wall and the ground outside of it to a pit that would have been previously dug at the point which a structure's supply pipe would connect to the water main. Note that the water which would be supplied via the extension rod and primary bit in this system would help soften the ground, thereby making it easier to penetrate.

Upon reaching the pit, the primary bit would be removed and replaced by the secondary bit. The secondary bit, along with a line connected to its end, would then be pulled back by the extension rod through the bore hole which had been previously formed by the primary bit. There after, the extension rod would be removed and a water pipe, preferably a copper water pipe, or an electrical conduit could then be coupled to the secondary bit via a suitable adapter or coupler. The secondary bit with the pipe or conduit would then be pulled through the bore hole via a winch attached to the remote or outer end of the line.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A boring and conduit/pipe system for forming a hole through a wall and for pulling a linear member through the hole comprising, in combination:

an operator controlled drill with a chuck rotatable about a central axis, the chuck having a water passageway there through along the central axis;

an extension rod having an interior end and an exterior end with a water passageway there between along the central axis, the exterior end being formed with male screw threads and the interior end being removably received by the chuck for rotation there with;

a primary bit having an interior end and an exterior end, the primary bit having a generally cylindrical section extending forwardly from the interior end and a conical section extending rearwardly from the exterior end, the conical section including four helical ridges along the length thereof, the primary bit including a water passageway formed of a large diameter bore extending forwardly from the interior end with four small diameter bores extending forwardly from the large diameter bore to an intermediate extent of the conical section for delivering jets of water from the chuck, extension rod, large diameter bore and small diameter bores and to exterior of the primary bit between the ridges, the large diameter bore having female threads at the interior end for releasably coupling with the male threads of the extension rod for rotation there with to form a bore hole in a wall;

a secondary bit having an interior end and an exterior end, the secondary bit having a generally cylindrical section extending forwardly from the interior end and a conical section extending rearwardly from the exterior end, the secondary bit including a water passageway formed of a large diameter bore extending forwardly from the interior end with four small diameter bores extending forwardly from the large diameter bore to an intermediate extent of the conical section for delivering jets of water from the chuck, extension rod, large diameter bore and small diameter bores and to exterior of the secondary bit, the large diameter bore having female threads at the interior end for releasably coupling with the male threads of the extension rod for rotation there with, a central forward bore coupling the exterior end and the large diameter bore of the secondary bit with a length of line there through and an insert with an aperture in the large diameter bore, the line having an interior end extending through the large diameter bore of the secondary bit and the aperture of the insert, the line also having and an exterior end coupled to a winch whereby the primary bit may be removed from the extension rod after it has moved through the wall and the secondary bit attached for retracting the secondary bit and line from the bore hole; and a coupler having a rearward end couplable to a linear member adapted to be pulled through the bore hole and a forward end couplable to the rearward end of the secondary bit after the secondary bit and line have been retracted from the bore hole whereby the line and secondary bit and linear member may be pulled through the bore hole.

2. A boring system comprising:

an extension rod having an interior end and an exterior end formed with male screw threads;

a primary bit having a cylindrical interior end and a conical exterior end, with female threads at the interior end for releasably coupling with the extension rod;

a secondary bit having a cylindrical interior end and a conical exterior end, with female threads at the interior end for releasably coupling with the extension rod with a central forward bore in the conical exterior end, and with a length of line extending through the central forward bore for coupling the line to the exterior end of the secondary bit;

a coupler having a rearward end couplable to a linear member and a forward end couplable to the rearward end of the secondary bit whereby the line and secondary bit and linear member may be pulled through the bore hole;

a water passageway in the primary bit formed of a large diameter bore extending forwardly from the interior end with a plurality of small diameter bores extending forwardly from the large diameter bore to an intermediate extent of the conical section for delivering jets of water from the chuck, extension rod, large diameter bore and small diameter bores and to exterior of the primary bit; and a water passageway in the secondary bit formed of a large diameter bore extending forwardly from the interior end with a plurality of small diameter bores extending forwardly from the large diameter bore to an intermediate extent of the conical section for delivering jets of water from the chuck, extension rod, large diameter bore and small diameter bores and to exterior of the secondary bit.

3. The system as set forth in claim 2 and further including four helical ridges along the length of the conical section of the primary bit.

* * * * *